United States Patent
Kato et al.

(10) Patent No.: US 7,253,801 B2
(45) Date of Patent: Aug. 7, 2007

(54) INPUT DEVICE OF 3-D TRANSLATION AND ROTATION AND ITS METHOD AND RECORDING MEDIUM

(75) Inventors: Koichi Kato, Tokyo (JP); Kenji Mochizuki, Kodaira (JP); Shinichi Meguro, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 751 days.

(21) Appl. No.: 10/728,997

(22) Filed: Dec. 5, 2003

(65) Prior Publication Data

US 2004/0113889 A1    Jun. 17, 2004

Related U.S. Application Data

(62) Division of application No. 09/678,274, filed on Oct. 3, 2000, now Pat. No. 6,710,765.

(30) Foreign Application Priority Data

Oct. 5, 1999   (JP) .................................. 11-283670

(51) Int. Cl.
G09G 5/08 (2006.01)
H04N 7/00 (2006.01)
G02B 27/22 (2006.01)

(52) U.S. Cl. ...................... 345/156; 345/158; 347/229; 347/230; 348/36; 348/37; 359/462; 463/37; 463/38; 700/17; 700/83; 700/85

(58) Field of Classification Search ........ 345/156–158, 345/161–167; 347/229, 230; 348/36, 37; 359/462; 463/37, 38; 700/17, 83, 85

See application file for complete search history.

(56) References Cited

U.S. PATENT DOCUMENTS 5,227,985 A    7/1993    DeMenthon ................ 702/153
5,237,647 A *  8/1993    Roberts et al. ............. 345/419

(Continued)

FOREIGN PATENT DOCUMENTS

FR         2 768 528 A     3/1999

(Continued)

OTHER PUBLICATIONS

Koichiro Deguchi, *A Unified Approach to PnP Camera Calibration Problem by Projective Geometry*, "Computer Vision '90" Symposium, pp. 41-50, Aug. 1990.

Robert J. Holt et al., *Camera Calibration Problem: Some New Results*, Computer Vision, Graphis, and Image Processing: Image Understanting, vol. 54, No. 3, pp. 368-383, 1991.

(Continued)

*Primary Examiner*—Henry N. Tran
(74) *Attorney, Agent, or Firm*—Workman Nydegger

(57) ABSTRACT

A photo device condenses the bright spot on the display to project the spot light onto the projection plane, thereby projecting it onto photo detectors the projection plane. A counter counts the time from the time of a vertical sync signal and supplies its output to AND gates. A correspondence detector brings bright spot display positions on the display at multiple times into correspondence with their projection positions on the photo device in accordance to recording time. An extrinsic parameter calculator calculates the 3-D translation and rotation of the photo device with respect to the bright spot scanning surface of the display from at least three sets of the bright spot display positions and their corresponding projection positions.

8 Claims, 19 Drawing Sheets

U.S. PATENT DOCUMENTS

| | | | |
|---|---|---|---|
| 5,432,526 A | 7/1995 | Hyatt | 345/87 |
| 5,546,327 A | 8/1996 | Hattori et al. | 702/57 |
| 5,633,691 A | 5/1997 | Davis et al. | |
| 5,793,361 A | 8/1998 | Kahn et al. | |
| 5,796,387 A | 8/1998 | Smith, III et al. | |
| 5,805,196 A | 9/1998 | Nakanishi et al. | 347/230 |
| 6,064,423 A | 5/2000 | Geng | 348/36 |
| 6,300,931 B1 | 10/2001 | Someya et al. | 345/102 |
| 6,710,765 B1 * | 3/2004 | Kato et al. | 345/156 |

FOREIGN PATENT DOCUMENTS

| | | |
|---|---|---|
| JP | 06-300542 | 10/1994 |
| JP | 07-270124 | 10/1994 |
| JP | 08117448 | 5/1996 |
| JP | 08278846 | 10/1996 |
| JP | 09 325007 A | 12/1997 |
| JP | 11219253 | 8/1999 |
| JP | 11249806 | 9/1999 |

OTHER PUBLICATIONS

Robert M. Haralick et al., *Analysis and Solutions of the Three Point Perspective Pose Estimation Problem*, IEEE, Proc. CVPR91, pp. 592-598, 1991.

Juyang Weng, et al., *Camera Calibration with Distortion Models and Accuracy Evaluation*, IEEE Transactions on Pattern Analysis and Machine Intelligence, vol. 14, No. 10, pp. 965-980, Oct. 1992.

Yoshiko Nomura et al., *Simple Calibration Algorithm for High-Distortion-Lens Camera*, IEEE Transactions on Pattern Analysis and Machine Intelligence, vol. 14, No. 11, pp. 1095-1099, Nov. 1992.

Koichi Kato et al., *Camera Calibration by Projection of Elliptic Cone Method*, The Institute of Electronics, Information and Communication Engineers, Technical Report of IEICE, PRU94-112, pp. 39-46, 1995.

English translation of Japanese Patent Publication No. 09325007 A, published Dec. 10, 1997.

* cited by examiner

INPUT DEVICE OF 3-D TRANSLATION AND ROTATION AND ITS METHOD AND RECORDING MEDIUM

CROSS-REFERENCE TO RELATED APPLICATIONS

This application is a divisional of U.S. patent application Ser. No. 09/678,274 filed on Oct. 3, 2000, now U.S. Pat. No. 6,710,765, which claims priority to Japanese Patent Application No. 11-283670 filed Oct. 5, 1999, the content of which are incorporated hereinto by reference.

BACKGROUND OF THE INVENTION

1. The Field of the Invention

The present invention relates to an input device of 3-D translation and rotation and its method used for inputting 3-D translation and rotation to a data processing system such as a computer or to an amusement system.

2. The Relevant Technology

Recently, with an increase in processing speed of computers and development in computer graphics (CG) technique, 3-D input technique has been finding wide application in various fields rapidly. In particular, demand for 3-D input devices sharply increases in applications in the Internet typified by consumer entertainment systems or VRML (Virtual Reality Modeling Language). In computer graphic design or CAD systems, a mouse or tablet is very popular as an input device. In addition, to carry out manipulation, observation and modification of object models from an arbitrary direction, demand for inexpensive devices for viscerally inputting 3-D translation and rotation is escalating.

Today, there are various types of 3-D input devices such as those based on the measurement of magnetic fields, photometric stereo and acoustic time-of-flight, and a joystick. The devices based on the measurement of magnetic fields and photometric stereo carry out desired measurement of translation and rotation using a transmitter and receiver. The joystick includes a precision mechanical link to convert its movement to 3-D position information. The photometric stereo obtains 3-D position information from information of parallax using multiple TV cameras.

In addition, a device is proposed which employs four photo detectors and a display unit to obtain translation and rotation of the photo detectors (see, Japanese Patent Application Laid-open No. 9-325007 (1997), for example). The device utilizes the calculation method disclosed in Japanese Patent Application Laid-open No. 7-270124 (1995), enabling 3-D measurement with an inexpensive lens and a small number of photo devices. Since this method carries out 3-D measurement optically, it can achieve stable 3-D input without any effect of magnetic field or temperature.

Since the conventionally available 3-D input device based on the measurement of magnetic field measures variations in spatial magnetic field, it is vulnerable to metallic parts, electronic devices and geomagnetism. On the other hand, since the acoustic time-of-flight device measures the phase or time-of-flight of sonic waves, it is vulnerable to atmospheric pressure or temperature. In addition, both of them require a transmitter and receiver, thereby increasing the device size. Furthermore, since the joystick must carry out translation and rotation independently, it is inappropriate as a visceral 3-D input device.

Finally, since the 3-D input device employing the four photo detectors and display unit (Japanese Patent Application Laid-open No. 9-325007 (1997), for example) has a minimum number of photo detectors necessary, even omission of a single detection point on the display disables the 3-D measurement. Furthermore, since the calculation method disclosed in Japanese Patent Application Laid-open No. 7-270124 (1995) markedly reduces its sensitivity when the display surface directly faces the photo detectors, or when a line connecting parallel two of the four photo detectors is parallel to the display surface at the photo receiving side, the device is limited in its application. Moreover, since the 3-D measurement cannot be carried out until the detection of all the four photo detectors has been complemented, the 3-D measurement interval is limited to within the interval between the scanning time of the display unit.

SUMMARY OF THE INVENTION

An object of the present invention is to provide an input device of 3-D translation and rotation and its method that can carry out stable visceral 3-D input over a wide range at arbitrary measuring time intervals without the effect of electric fields or temperature, and requiring a small installation space.

To accomplish the foregoing object, according to a 1st aspect of the present invention, there is provided an input device of 3-D translation and rotation for measuring 3-D translation and rotation of a photo device with respect to a display emitting a bright spot, the input device of 3-D translation and rotation comprising: a display with a display surface on which a bright spot is movable; a photo device including a condense unit for condensing a bright spot on the display to be projected onto a projection plane, on which multiple photo detectors are disposed for detecting a projection position of the spot light on the projection plane; correspondence means for bringing a bright spot display position on the display into correspondence with a projection position of the spot light on the photo detectors; and an extrinsic parameter calculator for calculating the 3-D translation and rotation of the photo device with respect to the bright spot moving surface of the display from a set of multiple bright spot display positions and their projection positions which are brought into correspondence by the correspondence means.

According to a 2nd aspect of the present invention, the photo detectors for detecting the projection position of the spot light may consist of a set of photo detectors, each of which includes a spot-like photo window.

According to a 3rd aspect of the present invention, the photo detectors with spot-like photo windows may consist of three photo detectors, and the bright spot display positions and the projection positions, which are brought into correspondence by the correspondence means, and which may have three positions each.

According to a 4th aspect of present invention, the photo detectors with spot-like photo windows may consist of at least five photo detectors, and the bright spot display positions and the projection positions, which are brought into correspondence by the correspondence means, and which may have at least five positions each.

According to a 5th aspect of the present invention, the correspondence means may comprise: means for bringing a projection image position on the photo detectors into correspondence with projection time, the projection being a position formed by projecting the bright spot on the display onto the projection plane of the photo device; means for recording the projection positions in accordance with the recorded projection time.

According to a 6th aspect of the present invention, the display may carry out scanning and display of the bright spot.

According to a 7th aspect of the present invention, the display may employ a CRT display for carrying out scanning and display of the bright spot.

According to an 8th aspect of the present invention, the display may employ a ray projection device and projection board for carrying out scanning and display of the bright spot.

According to a 9th aspect of the present invention, the photo device may comprise multiple sets of condense units and projection planes, the multiple sets having different optical axes.

According to a 10th aspect of the present invention, the photo device may comprise means for mounting it on a mobile unit such as a robot and vehicle, or for wearing it on part of a body, or for holding it by part of the body.

According to an 11th aspect of the present invention, the photo device may be combined with a device for converting 2-D movement into digital 2-D information.

According to a 12th aspect of the present invention, the device for converting may consist of one of a trackball, a mouse and a laser range finder.

According to a 13th aspect of the present invention, the photo device may be made freely movable by utilizing one of wired and wireless transmission of its output signal.

According to a 14th aspect of the present invention, the photo detectors for detecting the projection position of the spot light may consist of a photo detector including a flat photo detecting face for detecting the position of the spot light.

According to a 15th aspect of the present invention, the correspondence means may comprise: means for bringing a projection image position of the spot light on the photo detectors into correspondence with projection time, the projection image position of the spot light being a position formed by projecting the bright spot on the display onto the projection plane of the photo device; means for recording the projection position and projection time; and a correspondence detector for bringing bright spot display positions at multiple times into correspondence with their projection positions in accordance with the recorded projection time.

According to a 16th aspect of the present invention, the photo device may consist of a position sensitive light detector.

According to a 17th aspect of the present invention, the display may carry out scanning and display of the bright spot.

According to an 18th aspect of the present invention, the display may employ a CRT display for carrying out scanning and display of the bright spot.

According to a 19th aspect of the present invention, the display may employ a ray projection device and projection board for carrying out scanning and display of the bright spot.

According to a 20th aspect of the present invention, the photo device may comprise multiple sets of condense units and projection planes, the multiple sets having different optical axes.

According to a 21st aspect of the present invention, the photo device may comprise means for mounting it on a mobile unit such as a robot and vehicle, or for wearing it on part of a body, or for holding it by part of the body.

According to a 22nd aspect of the present invention, the photo device may be combined with a device for converting 2-D movement into digital 2-D information.

According to a 23rd aspect of the present invention, the device for converting may consist of one of a trackball, a mouse and a laser range finder.

According to a 24th aspect of the present invention, the photo device is made freely movable by utilizing one of wired and wireless transmission of its output signal.

According to a 25th aspect of the present invention, there is provided an input method of 3-D translation and rotation for measuring 3-D translation and rotation of a photo device with respect to a display emitting a bright spot, the input method of 3-D translation and rotation comprising the steps of: moving the bright spot freely on a display surface of the display; condensing the bright spot on the display, and detecting a projection position of the spot light projected onto a projection plane; bringing a bright spot display position on the display into correspondence with the projection position of the spot light on photo detectors; and calculating the 3-D translation and rotation of the photo device with respect to the bright spot moving surface of the display from a set of multiple bright spot display positions and their projection positions which are brought into correspondence.

According to a 26th aspect of the present invention, the photo detectors for detecting the projection position of the spot light may consist of a set of photo detectors, each of which includes a spot-like photo window.

According to a 27th aspect of the present invention, the step of bringing may comprise the sub-steps of: bringing a projection image position on the photo detectors into correspondence with projection time, the projection image position being a position formed by projecting the bright spot on the display onto the projection plane of the photo device; recording the projection position and projection time; and bringing bright spot display positions at multiple times into correspondence with their projection positions in accordance with the recorded projection time.

According to a 28th aspect of the present invention, the photo detectors for detecting the projection position of the spot light may consist of a photo detector including a flat photo detecting face for detecting the position of the spot light.

According to a 29th aspect of the present invention, the step of bringing may comprise the sub-steps of: bringing a projection image position of the spot light on the photo detectors into correspondence with projection time, the projection image position of the spot light being a position formed by projecting the bright spot on the display onto the projection plane of the photo device; recording the projection position and projection time; and bringing bright spot display positions at multiple times into correspondence with their projection positions in accordance with the recorded projection time.

According to a 30th aspect of the present invention, there is provided a computer readable recording medium for causing a computer to execute an input method of 3-D translation and rotation for measuring 3-D translation and rotation of a photo device with respect to a display emitting a bright spot, the computer readable recording medium causes the computer to execute the steps of: moving the bright spot freely on a display surface of the display; condensing the bright spot on the display, and detecting a projection position of the spot light projected onto a projection plane; bringing a bright spot display position on the display into correspondence with the projection position of the spot light on photo detectors; and calculating the 3-D translation and rotation of the photo device with respect to the bright spot moving surface of the display from a set of multiple bright spot display positions and their projection positions which are brought into correspondence.

According to a 31st aspect of the present invention, the photo detectors for detecting the projection position of the spot light may consist of a set of photo detectors, each of which includes a spot-like photo window, and the step of bringing may comprise the sub-steps of: bringing a projection image position on the photo detectors into correspondence with projection time, the projection image position being a position formed by projecting the bright spot on the display onto the projection plane of the photo device; recording the projection position and projection time; and bringing bright spot display positions at multiple times into correspondence with their projection positions in accordance with the recorded projection time.

According to a 32nd aspect of the present invention, the spot light on the photo detectors at the step of bringing may be the spot light detected and output from the photo detectors, and the step of bringing may comprise the sub-steps of: bringing a projection image position of the spot light on the photo detectors into correspondence with projection time, the projection image position of the spot light being a position formed by projecting the bright spot on the display onto the projection plane of the photo device; recording the projection position and projection time; and bringing bright spot display positions at multiple times into correspondence with their projection positions in accordance with the recorded projection time.

The input device of the 3-D translation and rotation in accordance with the present invention can consist of only the semiconductor device capable of detecting the projection image position, and the display for moving or scanning the bright spot on its 2-D display surface so that the input device can be implemented, which requires only a small installation space and can achieve reliable 3-D measurement free from the influence of the magnetic field or temperature. By measuring the 3-D translation and rotation at three points using the three photo detectors, the 3-D translation and rotation can be measured at minimum time intervals. In addition, by bringing the bright spot display positions at any multiple times into correspondence with their projection positions on the photo device in accordance with the recorded time, and by calculating the 3-D translation and rotation of the photo device with respect to the bright spot moving surface or the bright spot scanning surface of the display from the set of the arbitrary number of the bright spot display positions and their projection positions, the calculation of the 3-D translation and rotation can be implemented from the arbitrary number of the bright spots at arbitrary positions and their projection image positions. This offers an advantage of being able to achieve the visceral 3-D input over a wide range without being affected by the scanning interval of the display.

The input device of the 3-D translation and rotation in accordance with the present invention can consist of only the semiconductor device capable of detecting the projection image position, and the display for moving or scanning the bright spot on a 2-D surface so that the input device can be implemented, which requires only a small installation space and can achieve reliable 3-D measurement free from the influence of the magnetic field or temperature. By measuring the 3-D translation and rotation at three points using the three photo detectors, the 3-D translation and rotation can be measured at minimum time intervals. In addition, by bringing the bright spot display positions at any multiple times into correspondence with their projection positions in accordance with the recorded time, and by calculating the 3-D translation and rotation of the photo device with respect to the bright spot moving surface or the bright spot scanning surface of the display from the set of the multiple bright spot display positions and their projection positions, the calculation of the 3-D translation and rotation can be implemented from the multiple sets of minimum 3 projection images abstracted from arbitrary number of the projection images at arbitrary positions and the associated bright spot display positions. This offers an advantage of being able to achieve the visceral 3-D input over a wide range without being affected by the scanning interval of the display.

The above and other objects, features and advantages of the present invention will become more apparent from the following description of embodiments thereof taken in conjunction with the accompanying drawings.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

The invention will now be described with reference to the accompanying drawings.

Embodiment 1

Figure 1:
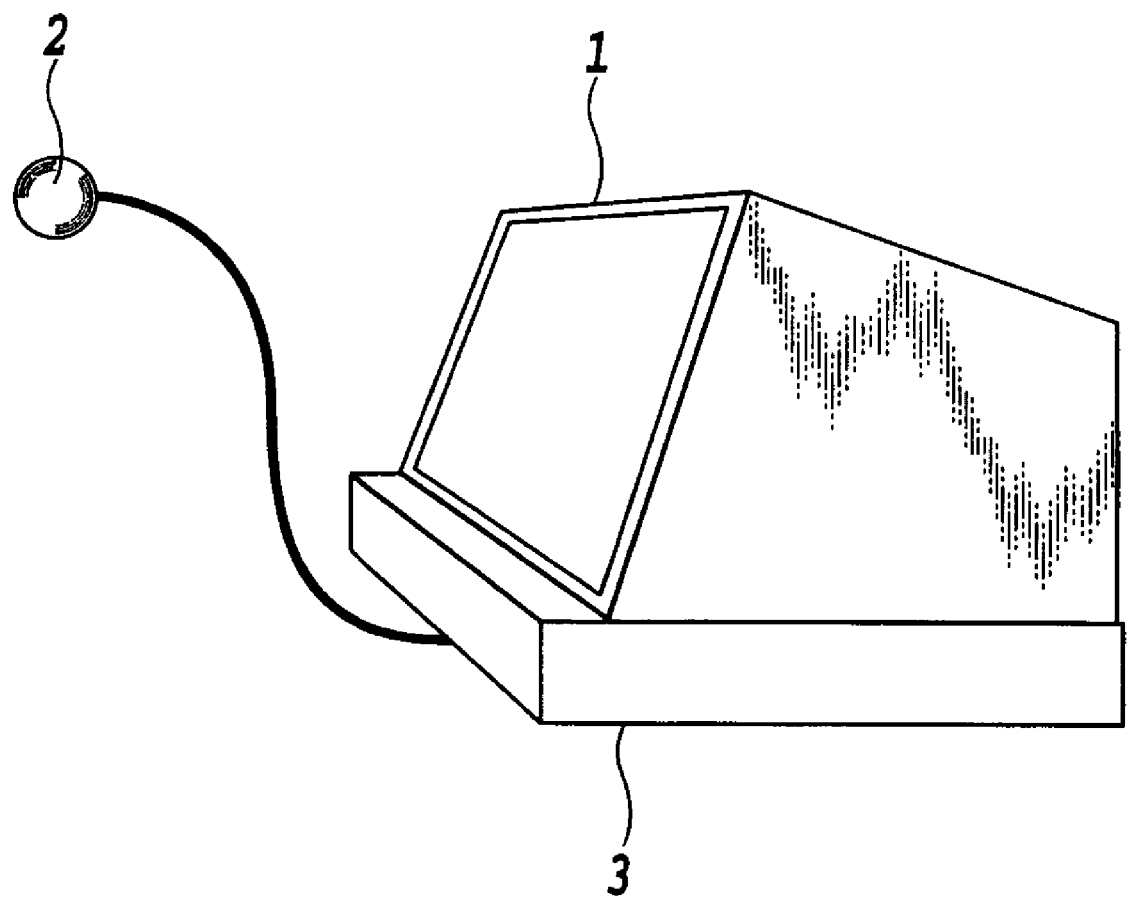
FIG. 1 is a perspective view of an embodiment of an apparatus in accordance with the present invention.

FIG. 1 is a perspective view illustrating an embodiment of an input device of 3-D translation and rotation in accordance with the present invention. In FIG. 1, the reference numeral 1 designates a raster-type display (called "display" from now on), 2 designates a photo device, and 3 designates a 3D-position output module.

The basic principle of the present invention is to observe a figure or the like of scanning loci drawn on the face of the display 1 by the photo device 2, and to process the observed information and scanning information by the 3D-position output module 3, thereby outputting the translation and rotation of the photo device 2.

Figure 2:
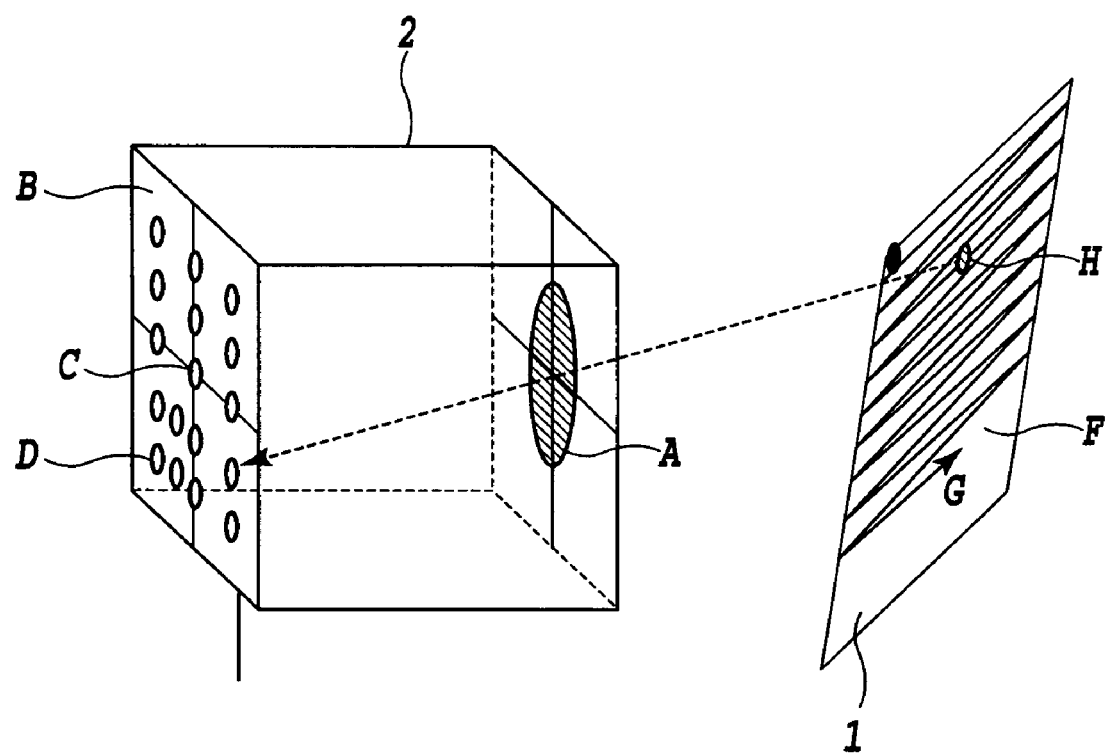
FIG. 2 is a perspective view showing a configuration of a photo device of a first embodiment in accordance with the present invention.

FIG. 2 is a perspective view showing a configuration of the photo device 2 in a first embodiment in accordance with the present invention. In the present embodiment, the photo device 2 consists of multiple photo detectors for converting light intensity into an electric signal. In FIG. 2, the reference symbol A designates a lens, B designates a projection plane of light passing through the lens A, C designates a center at which the optical axis of the lens intersects with the light projection plane B, D designates photo detectors, and F designates the face of a raster-type display. The photo detectors D are disposed on the projection plane B. At least three photo detectors D must be provided, and five or more photo detectors are preferable because they make it possible to achieve wide range measurement at any desired time intervals by implementing measurement of the 3-D translation and rotation using three or four of them. The display surface F is irradiated with electron beams at every fixed interval, on which a high brightness spot moves at a high speed along the arrow G. In this case, each photo detector D exhibits its peak output when the high brightness spot passes the intersection (H, for example) of the display surface F with the line connecting the photo detector D and the center of the lens A.

Figure 3:
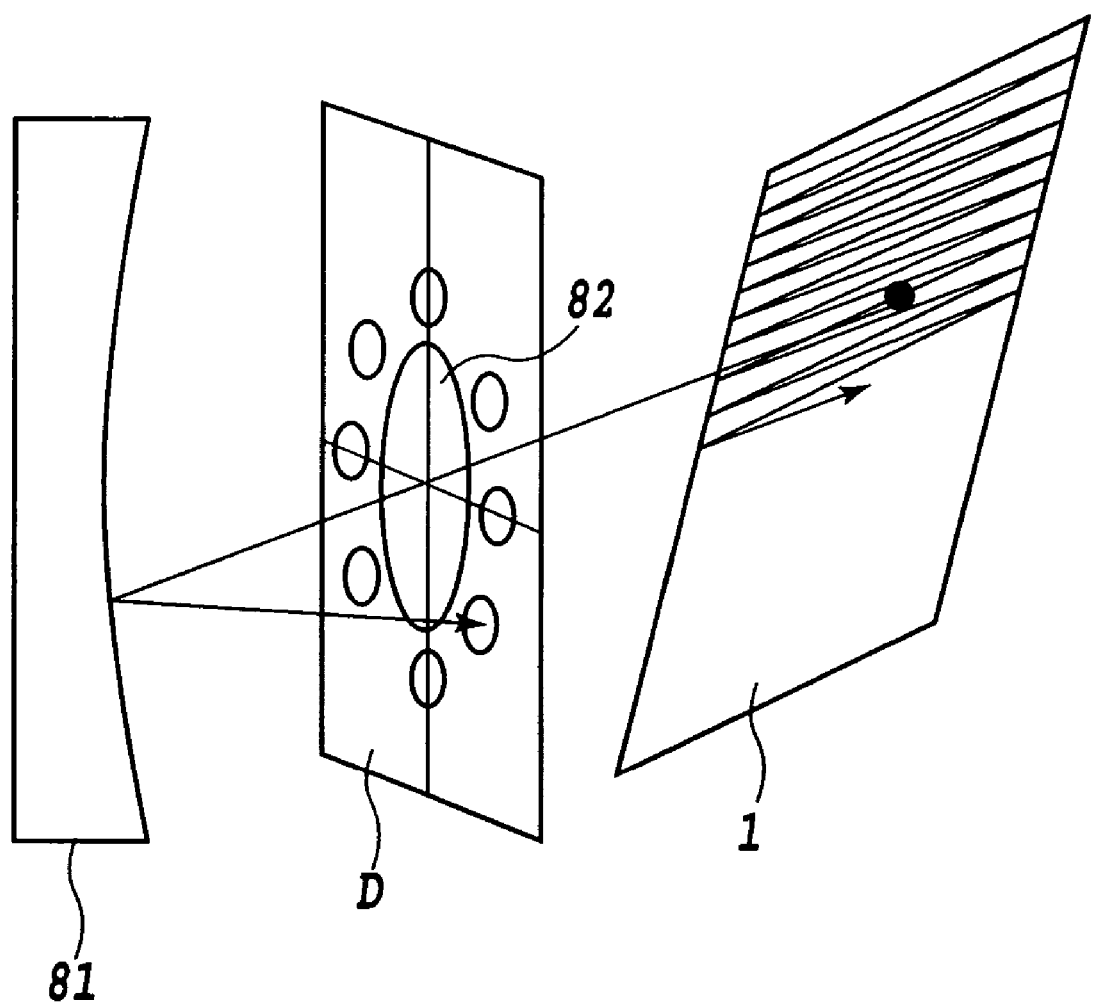
FIG. 3 is a perspective view showing another configuration of the photo device of the first embodiment in accordance with the present invention.

FIG. 3 is a perspective view showing another configuration of the photo device of the first embodiment in accordance with the present invention. In FIG. 3, the reference numeral 81 designates a concave mirror and 82 designates a condense window. The photo device differs from that shown in FIG. 2 in that it employs the concave mirror as the condense unit.

Figure 4:
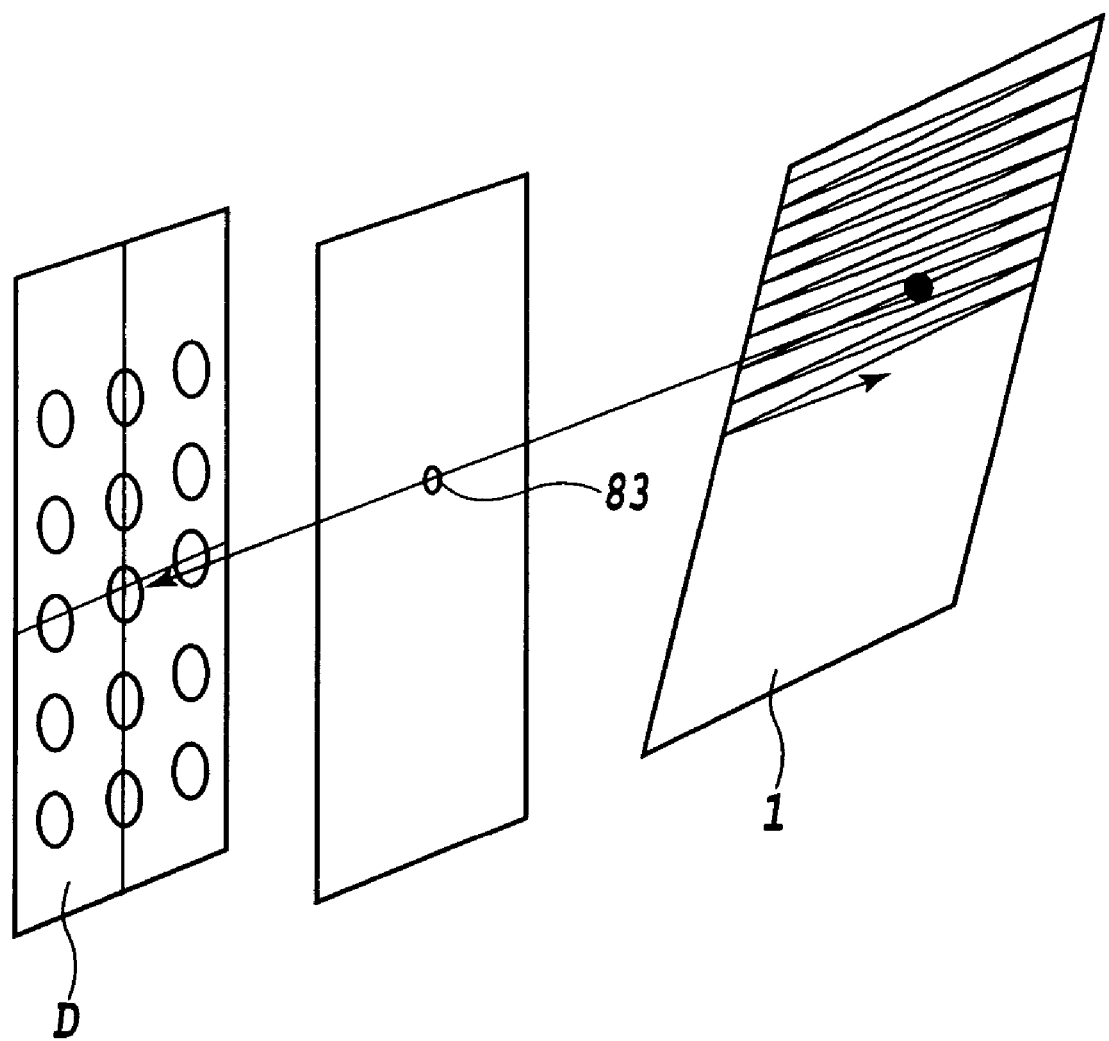
FIG. 4 is a perspective view showing still another configuration of the photo device of the first embodiment in accordance with the present invention.

FIG. 4 is a perspective view showing another configuration of the photo device of the first embodiment in accordance with the present invention. In FIG. 4, the reference numeral 83 designates a pinhole. The photo device differs from that shown in FIG. 2 in that it employs the pinhole as the condense unit.

Figure 5:
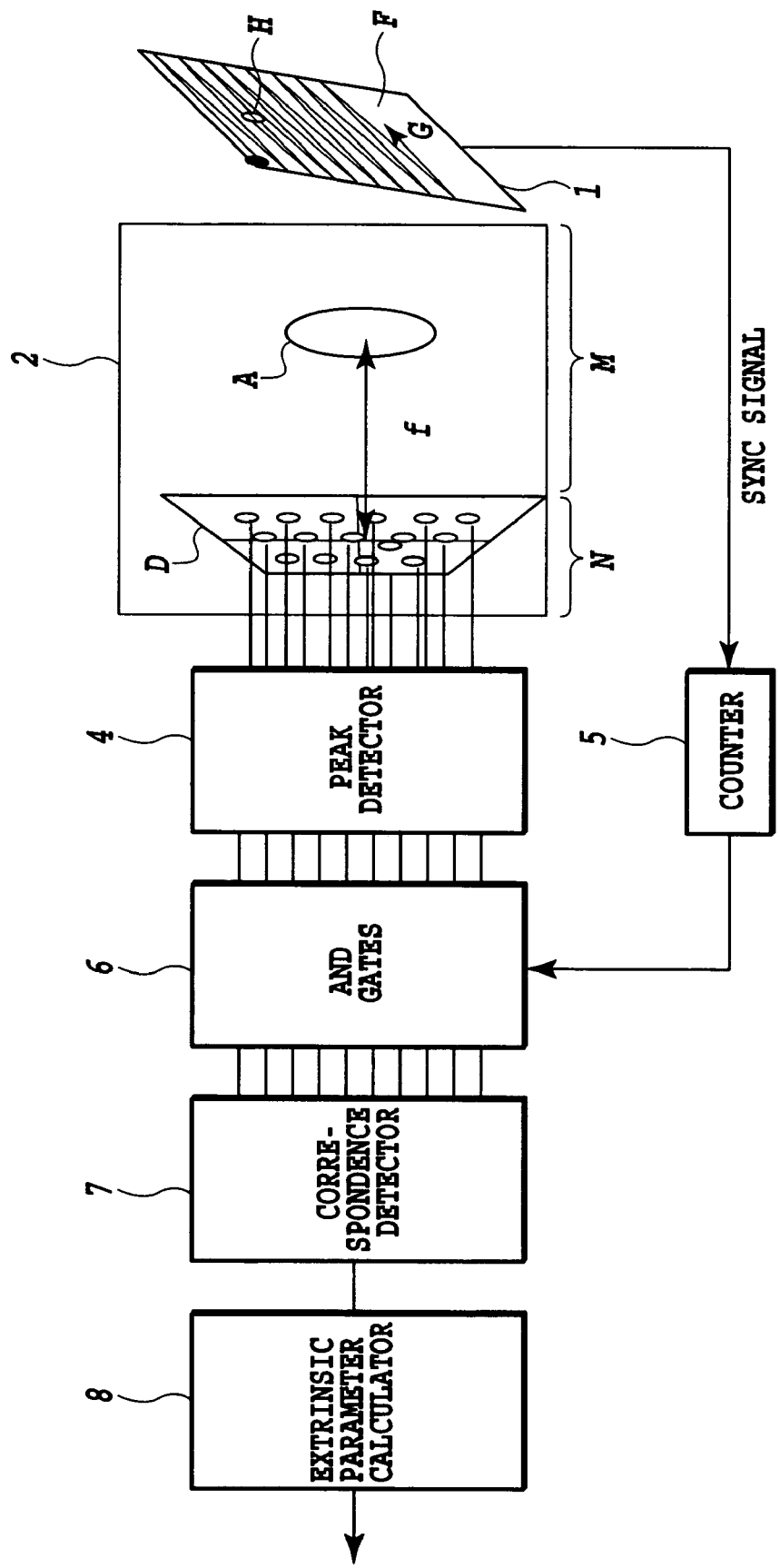
FIG. 5 is a block diagram showing a configuration of the first embodiment in accordance with the present invention.

FIG. 5 is a block diagram showing a configuration of the first embodiment in accordance with the present invention. In FIG. 5, the reference numeral 4 designates a peak detector for detecting peak values of the individual photo detectors D using a predetermined threshold. The intersection on the display surface F can be measured by obtaining the delay between the peak time and the time of a vertical sync signal. The reference numeral 5 designates a counter that is reset by the vertical sync signal of the display 1, and increments its count at every fixed period (or may count a predetermined time signal) to count time from the vertical sync signal. Its counting rate is determined such that it can detect the point of the electron beam on the display 1 at sufficiently high accuracy. The output of the counter 5 is supplied to AND gates 6. The AND gates 6, receiving signals from the peak detector 4, inactivates (when detecting no peak) or activates (when detecting the peak) the output of the counter for each of the photo detectors D. The reference numeral 7 designates a correspondence detector for bringing bright spot display positions on the display 1 at multiple timings into correspondence with projection image positions on the photo device 2 in accordance with their recording time. The reference numeral 8 designates an extrinsic parameter calculator for calculating the 3-D translation and rotation of the photo device 2 with respect to the bright spot scanning surface of the display 1 from a set of the multiple (at least three) bright spot display positions and their corresponding projection image positions. The foregoing components 5–8 constitute the 3D-position output module 3 of the present embodiment. The reference symbol N designates a projection plane and M designates a condense unit.

Figure 6:
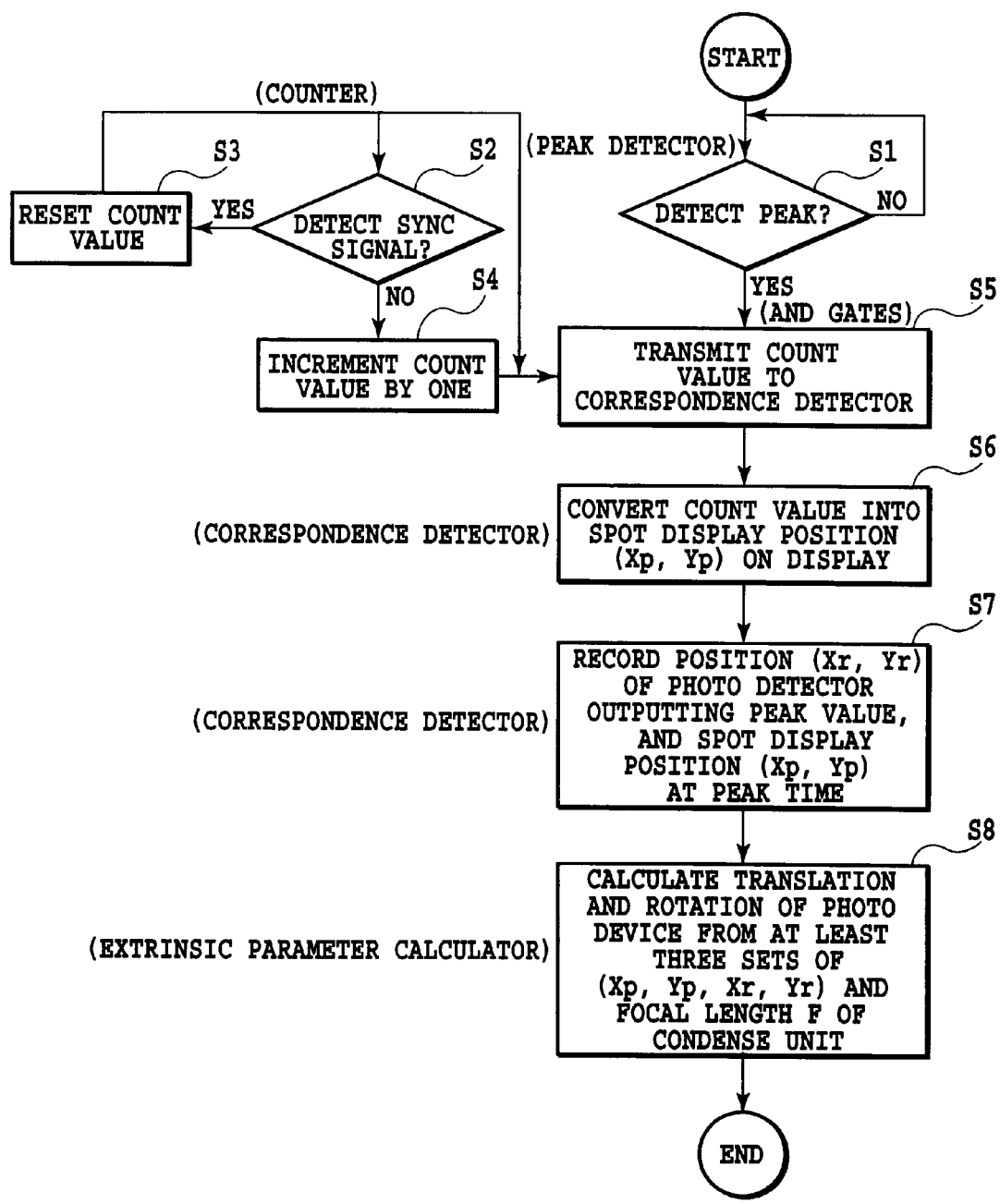
FIG. 6 is a flowchart illustrating the operation of the first embodiment in accordance with the present invention.

FIG. 6 is a flowchart illustrating the operation of the first embodiment in accordance with the present invention. The operation will be described with reference to FIG. 6.

(First Stage)

Assume that the peak detector 4 detects a peak value of one of the photo detectors D (step S1). The position of the intersection on the screen can be obtained by obtaining the time delay of the time of the peak value from the time of vertical sync signal on the display surface F. The AND gates 6 are informed of the detection of the peak value. On the other hand, detecting the sync signal (vertical sync signal) of the display 1 (step S2), the counter 5 uses it as its reset signal and starts counting (step S3). When detecting no sync signal, the counter increments its count by one, and supplies its output to the AND gates 6 (step S4). The AND gates 6 supplies the count value to the correspondence detector 7 for each of the photo detectors D that detect the peak value (step S5).

(Second Stage)

The correspondence detector 7 converts the count value to the spot display position (Xp, Yp) on the display 1 (step S6), and records the position (Xr, Yr) of the photo detector D that outputs the peak value and the spot display position (Xp, Yp) at that time (step S7).

(Third Stage)

The extrinsic parameter calculator 8 can compute the translation and rotation of the photo device 2 from a set of (Xp, Yp, Xr, Yr) of at least three points and from the focal length f of the condense unit of the photo device 2 (step S8). A concrete method of the calculation method is described, for the three point calculation, in a paper by Koichiro Deguchi R. J. Holt and A. N. Netravali. "Camera calibration problem: Some new results. Computer Vision, Graphics, and Image Processing:" Image Understanding, Vol. 54, No. 3, PP. 368–383, 1991. for example; and for the four point calculation, in a paper by Koichi Kato, et al. "Camera Calibration by Projection of Elliptic Cone Method", pp. 39–46 of Technical Report PRU94-112 (1995–01) of the Institute of Electronics, Information and Communication Engineers of Japan, or in Japanese Patent Application Laid-open No. 7-270124 (1995). Using one of these calculation methods, the photo device 2 computes the 3-D translation and rotation, and outputs the calculation result. The calculation method of the 3-D translation and rotation for three or more points is described in R. M. Haralick, C. Lee, K. Ottenberg and M. Nolle, "Review and analysis of solutions of the three point perspective pose estimation problem", Proc. CVPR91, 1991.

Figure 13:
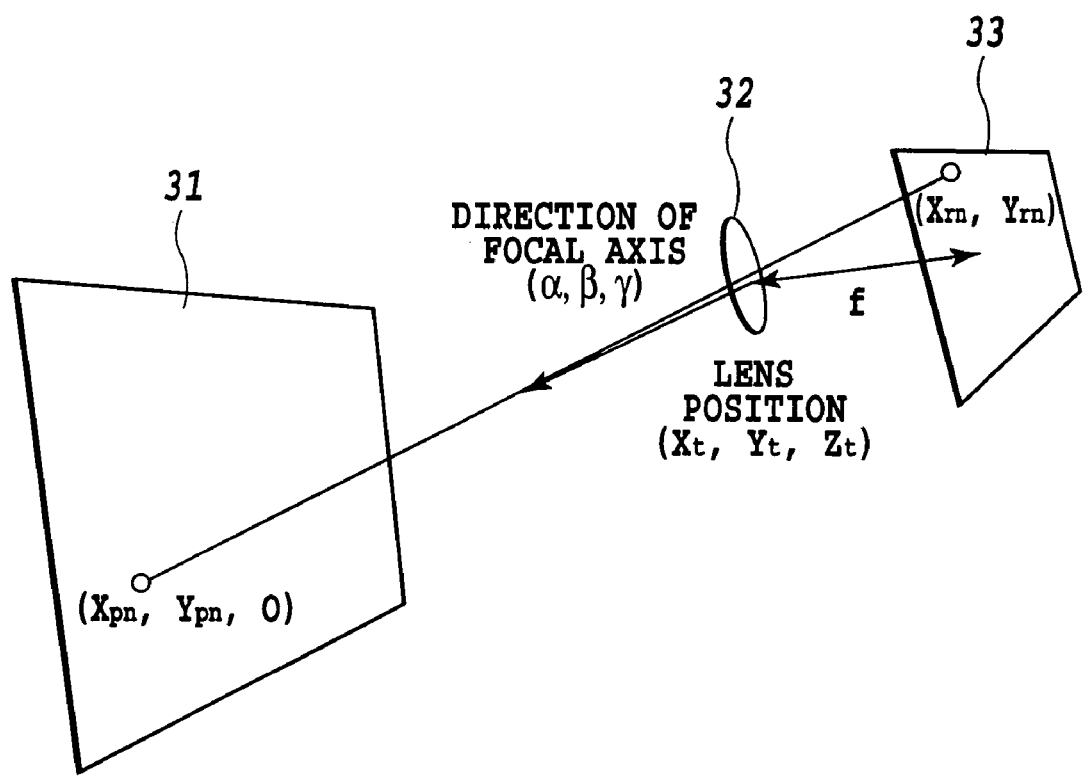
FIG. 13 is a diagram illustrating a calculation method of 3-D translation and rotation based on at least three points.

The calculation method for multiple points equal to or greater than three will now be described with reference to FIG. 13.

Assuming that the direction of focal axis of the condense unit of the photo device is rotated by $\alpha$, $\beta$ and $\gamma$ about the X, Y and Z axes, respectively, the rotation matrix of the photo device is expressed as follows:

$$R = \begin{bmatrix} \cos\gamma & -\sin\gamma & 0 \\ \sin\gamma & \cos\gamma & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix} \begin{bmatrix} 1 & 0 & 0 \\ 0 & \cos\alpha & -\sin\alpha \\ 0 & \sin\alpha & \cos\alpha \end{bmatrix}$$

$$= \begin{bmatrix} a1 & b1 & c1 \\ a2 & b2 & c2 \\ a3 & b3 & c3 \end{bmatrix}$$

Furthermore, assuming that the center of the lens 32 with respect to the display surface 31 is (Xt, Yt, Zt), the position can be defined by the following translation matrix.

$$T = \begin{bmatrix} X_t \\ Y_t \\ Z_t \end{bmatrix}$$

Here, assuming that the distance from the center of the lens 32 to the photo detector surface 33 of the photo device is f, and an nth point on the display surface 21 is (Xpn, Ypn, 0), and its projection position on the photo detector is (Xrn, Yrn), their relationship is expressed as follows.

$$R \cdot \begin{bmatrix} X_{pn} \\ Y_{pn} \\ 0 \end{bmatrix} + T = \begin{bmatrix} X_{rn} \\ Y_{rn} \\ f \end{bmatrix}$$

This equation shows that the matrices R and T can be obtained as a solution of the simultaneous linear equations for n>3. Thus, the translation and rotation of the photo device 2 can be obtained when there are three or more sets of the points on the display surface and their corresponding point on the photo detectors.

Embodiment 2

Figure 7:
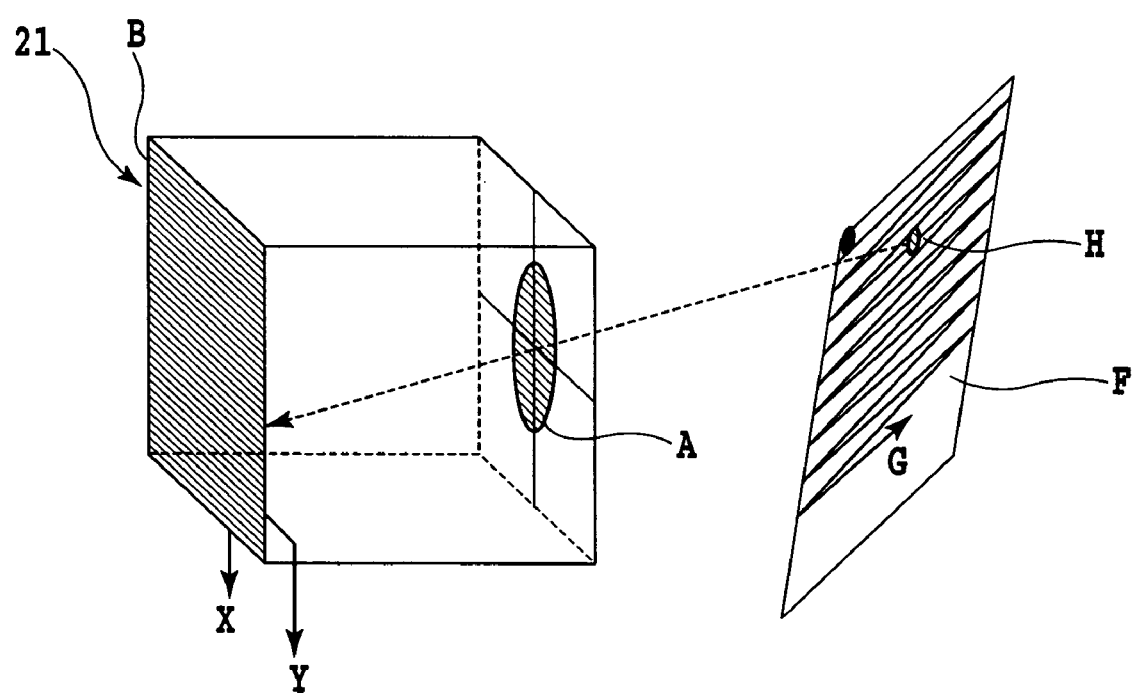
FIG. 7 is a perspective view showing a configuration of a photo device of a second embodiment in accordance with the present invention.

FIG. 7 is a perspective view showing a second embodiment in accordance with the present invention, which employs a position sensitive light detector (PSD) 21 as a photo detector on the projection plane B of the photo device 2. The principle of the present embodiment 2 is as follows. The PSD 21 consists of a silicon plate composed of three layer of P, I and N. When a light spot strikes the PSD 21, it brings about electrons proportional to the energy of photons of the incident light at the position of incidence. The electrons pass through a resistance layer (P layer in this case) as photo electrons, and are output from the output terminal at the projection spot position (X, Y). Thus, forming the resistance layer as a sufficiently uniform resistance distribution layer, the photo electrons are divided inversely proportional to the distance, that is, the resistance value, to electrodes, and are output from the output terminals at both ends. In this case, the position of incidence of the light can be obtained independently of the energy of photons.

Returning to the second embodiment, the position sensitive light detector 21 is disposed on the projection plane B. The display surface F is irradiated with the electron beam at every fixed period, and the high brightness spot moves thereon at a high speed as indicated by the arrow G. When the high brightness spot passes on the intersection (Xp, Yp, for example) of the display surface F with a line connecting a point on the position sensitive light detector 21 and the center of the lens A, the position sensitive light detector 21 outputs the spot position (Xr, Yr) electrically.

Figure 8:
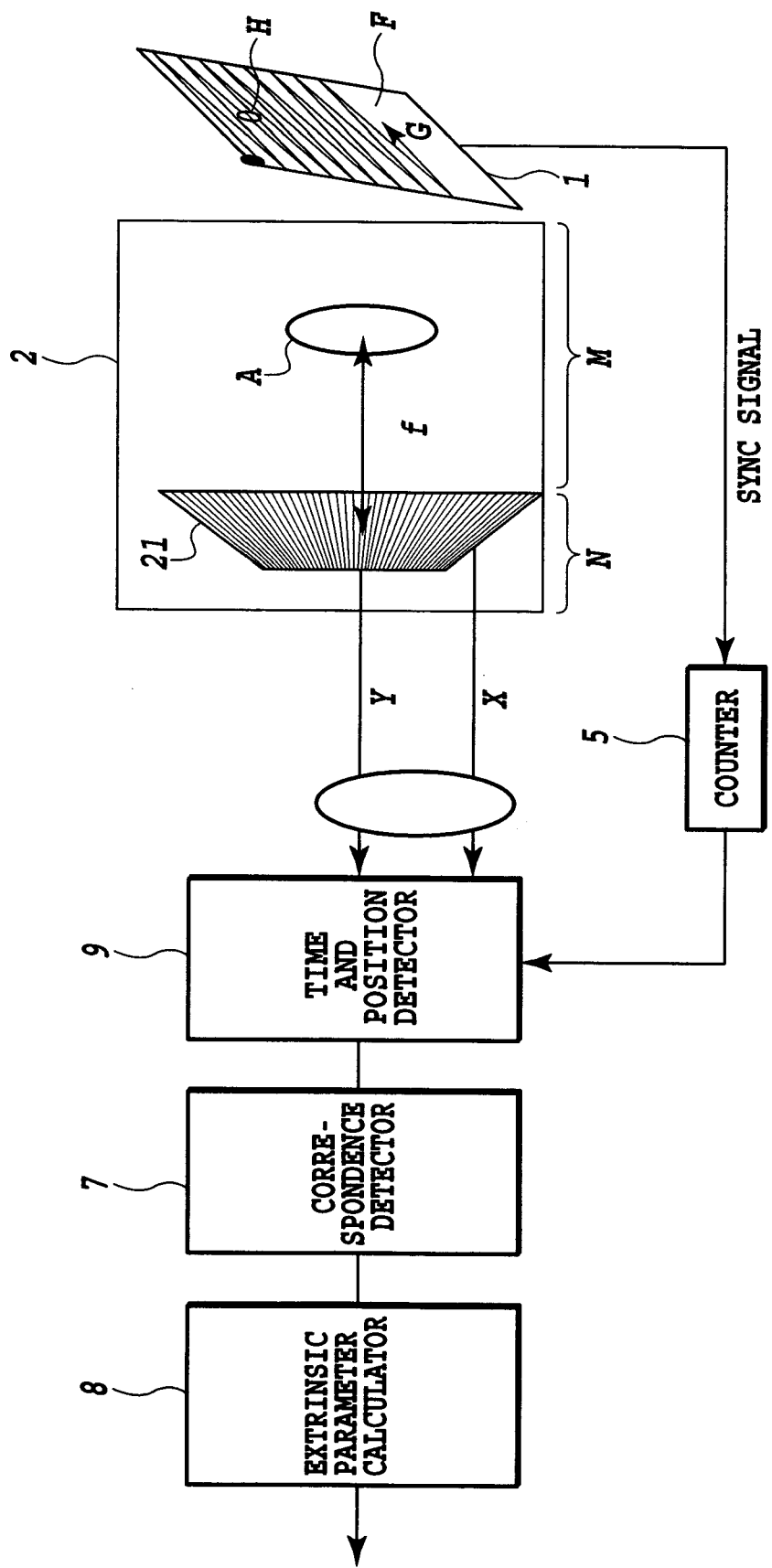
FIG. 8 is a block diagram showing a configuration of the second embodiment in accordance with the present invention.

FIG. 8 is a block diagram showing a configuration of the second embodiment in accordance with the present invention. In FIG. 8, the reference numeral 9 designates a time-and-position detector that supplies the correspondence detector 7 with the spot light detection position and the count value of the counter 5 as (Xr, Yr, T). The remaining configuration is the same as that of FIG. 5. The components 5, 7, 8 and 9 constitute the 3D-position output module 3 of the present embodiment.

Figure 9:
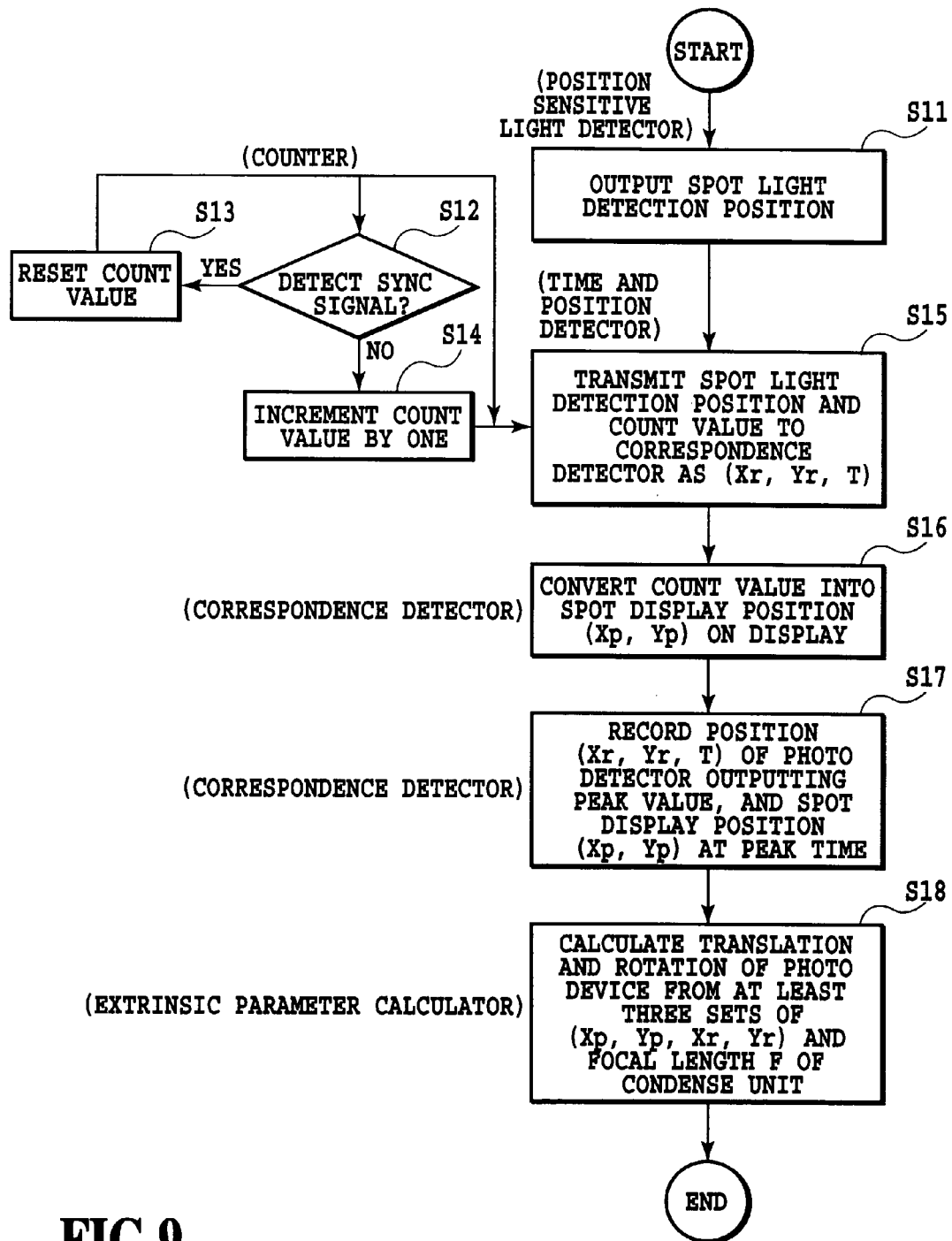
FIG. 9 is a flowchart illustrating the operation of the second embodiment in accordance with the present invention.

FIG. 9 is a flowchart illustrating the operation of the second embodiment in accordance with the present invention. Referring to FIG. 9, the operation will be described in detail.

(First Stage)

When spot light is projected on the position sensitive light detector 21, it outputs the detection position (X, Y) of the spot, and transfers it to the time-and-position detector 9 (step S11). On the other hand, detecting the vertical sync signal of the display 1 (step S12), the counter 5 uses the signal as its reset signal and starts counting (step S13). When detecting no sync signal, the counter 5 increments its count by one and supplies its output to the time-and-position detector 9 (step S14). The time-and-position detector 9 supplies the correspondence detector 7 with the detection position of the spot light and count value (Xr, Yr, T) (step S15).

(Second Stage)

The correspondence detector 7 converts the count value T to the spot display position (Xp, Yp) on the display 1 (step S16), and records the position (Xr, Yr, T) of the photo detector outputting the peak value, and the spot display position (Xp, Yp) at that time (step S17).

(Third Stage)

The extrinsic parameter calculator 8 calculates the translation and rotation of the photo device 2 from a set of (Xp, Yp, Xr, Yr) of at least three points and the focal length f of the condense unit of the photo device 2 (step S18).

Embodiment 3

Figure 10:
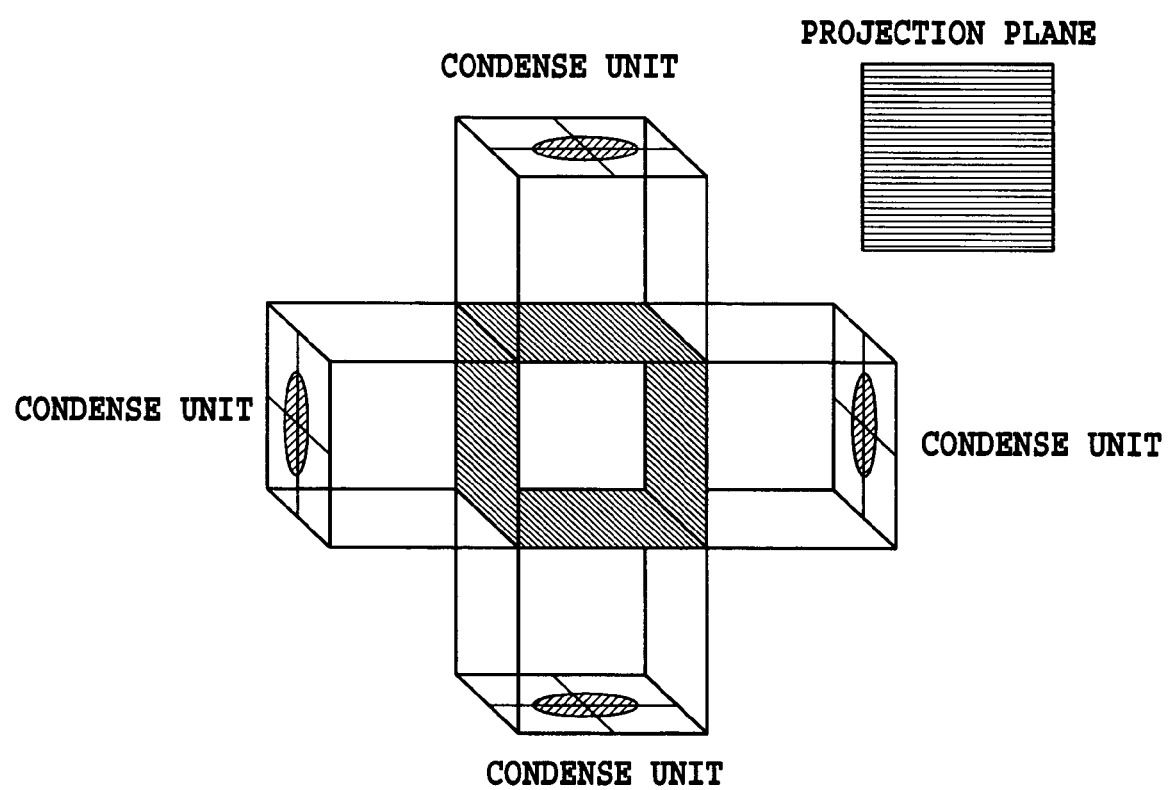
FIG. 10 is a perspective view showing a configuration of a photo device of a third embodiment in accordance with the present invention.

FIG. 10 is a perspective view showing a configuration of a photo device of a third embodiment in accordance with the present invention, which comprises multiple condense units and photo detectors to carry out a wider range of condensing. Although the example as shown in FIG. 10 includes four sets of condense units and photo units disposed in such a manner that optical axes of the four sets intersect perpendicularly to each other, the number of the condense units and photo units, or the angles between the optical axes can be determined freely. The operation principle is the same as that of the foregoing first and second embodiments.

Embodiment 4

Figure 11:
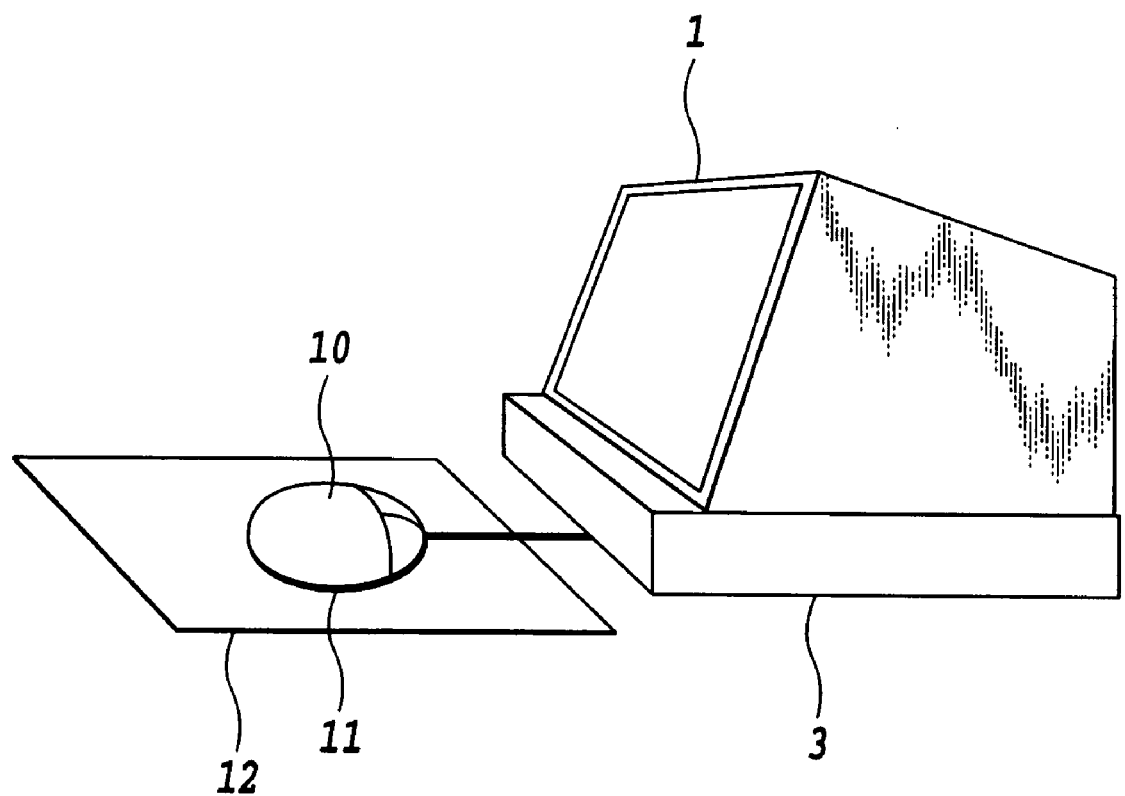
FIG. 11 is a perspective view showing an apparatus of a fourth embodiment in accordance with the present invention.

FIG. 11 is a perspective view illustrating a fourth embodiment in accordance with the present invention. The present embodiment is a combination of the photo device used in the first and second embodiment with a device for converting 2-D movement into 2-D digital information such as a trackball, mouse or laser range finder. The example as shown in FIG. 11 integrates a 2-D information converter 10 consisting of a mouse with a photo device 11.

Figure 12:
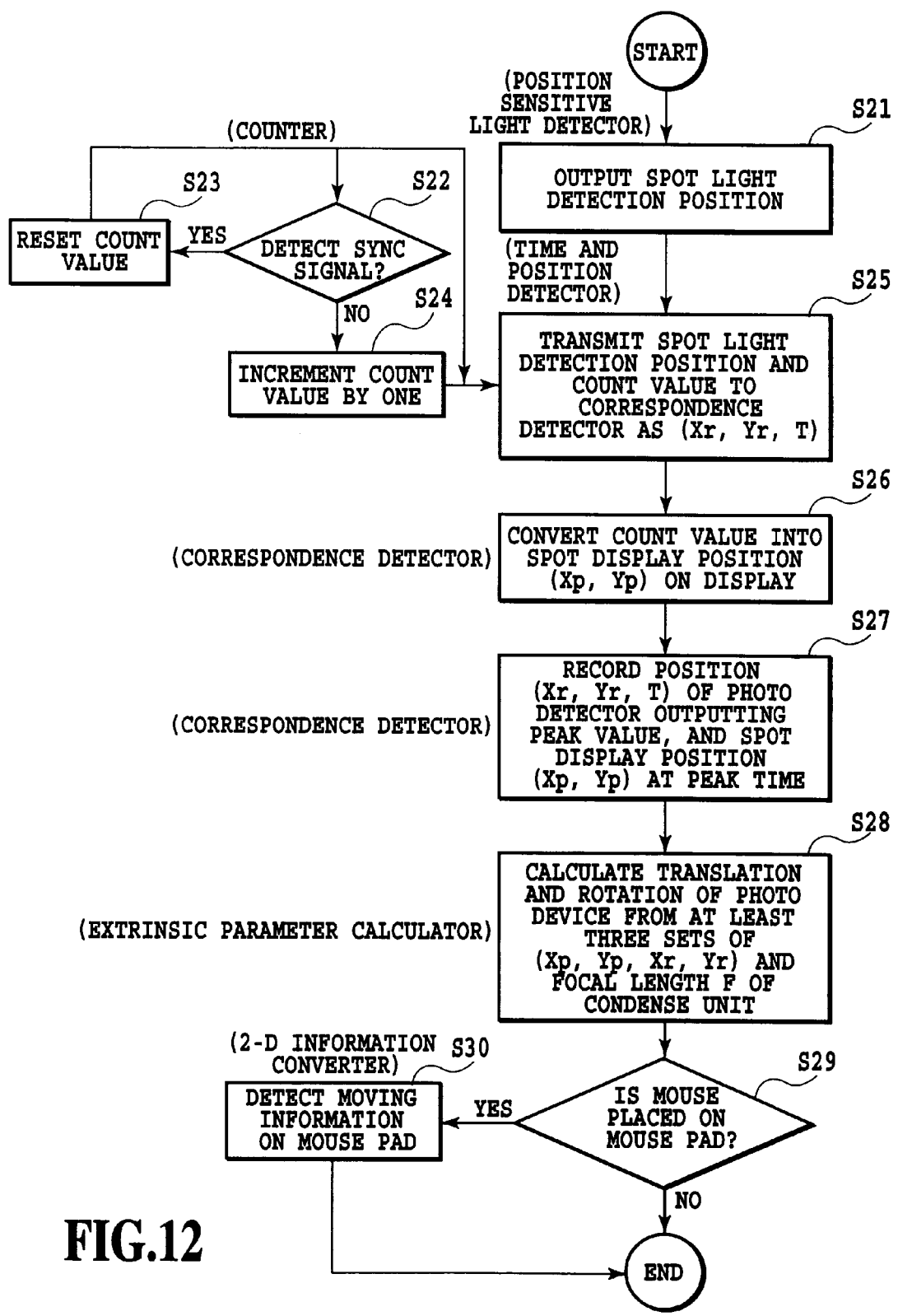
FIG. 12 is a flowchart illustrating the operation of the fourth embodiment in accordance with the present invention.

FIG. 12 is a flowchart illustrating the operation of the fourth embodiment. Referring to this figure, the operation of the present embodiment will be described in detail.

The operation of the present embodiment is the same as that of the first and second embodiments up to the stage that calculates the 3-D translation and rotation by the photo device 11 (step S21–step S28). Subsequently, a decision is made as to whether the 2-D information converter 10 like a mouse is placed on a mouse pad 12 (step S29). When it is separated from the mouse pad, the 3-D translation and rotation is output, whereas when it is placed on the mouse pad, the moving information of the 2-D information converter 10 on the mouse pad 12 is detected and output (step S30). Thus, the single input device can share the function of a mouse that enables an image processing when moved on the mouse pad, and the function of the 3-D translation and rotation input device when suspended over the mouse pad, improving the operability.

Incidentally, in the foregoing embodiments, the photo device 2, 2-D information converter 10 and photo device 11 can increase their flexibility in movement by utilizing wireless transmission of their output signals as compared with using wired transmission.

In addition, although the foregoing embodiments employ the display that carries out scanning at fixed intervals, the scanning intervals can be varied and any scanning scheme can be employed as long as the correspondence between the ray projection point on the photo device and the position of the bright point on the display is uniquely determined.

Furthermore, the photo device 2, 2-D information converter 10 and photo device 11 in the foregoing embodiments can be integrated into one body, and equipped with a means for wearing it on part of the body such as a hand, or for mounting it on a mobile unit such as a robot or vehicle, improving the operability.

Moreover, it is obvious that the functions of the components 5, 6, 7, 8 and 9 of FIGS. 5 and 8 can be implemented by a computer, and the procedures as shown in FIGS. 6, 9 and 12 can also be carried out by a computer. Programs for implementing the functions of the components can be provided or distributed by recording them on a computer readable recording medium such as a FD (floppy disk), MO (magnet-optical disk), ROM, memory card, CD, DVD (digital video disk) or any other removable disks.

Embodiment 5

Figure 14:
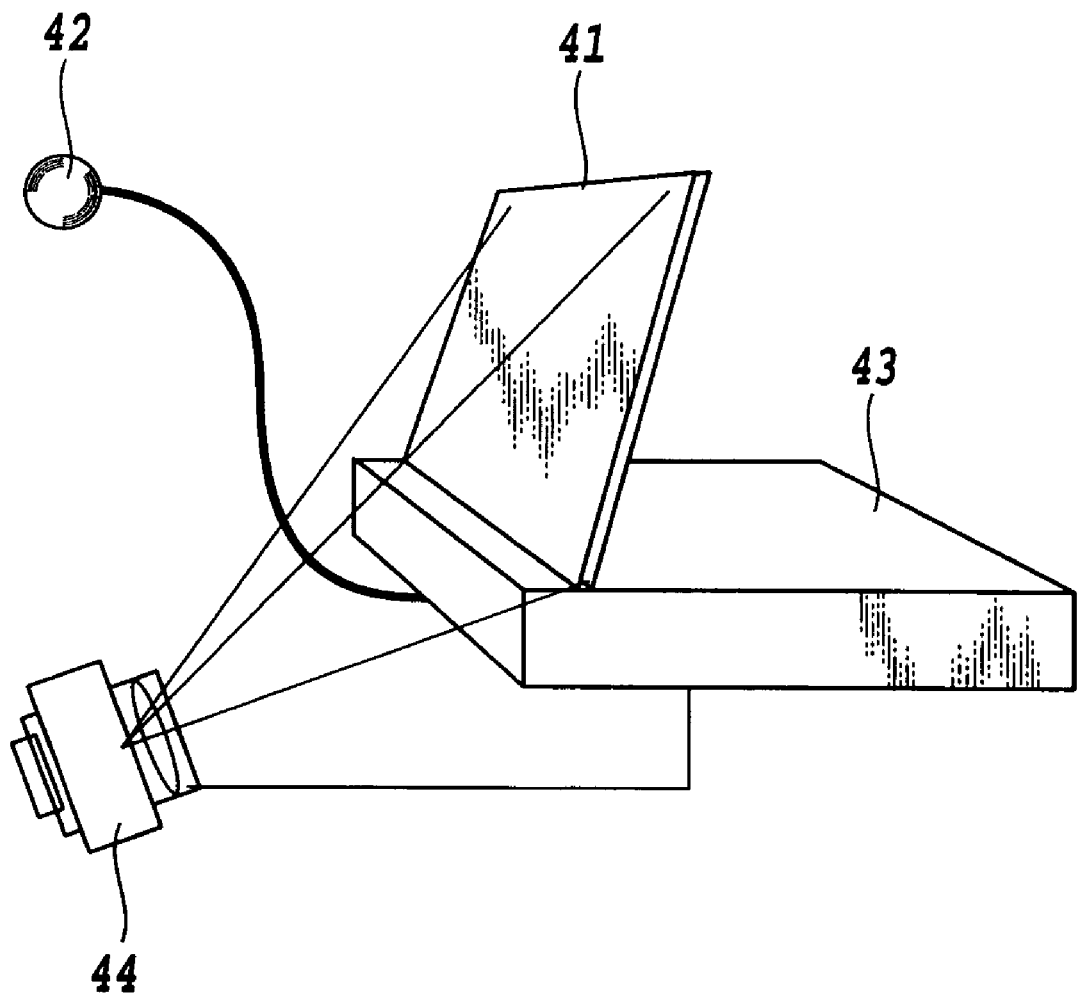
FIG. 14 is a perspective view illustrating a fifth embodiment in accordance with the present invention.

FIG. 14 is a perspective view illustrating a fifth embodiment in accordance with the present invention. In FIG. 14, the reference numeral 41 designates a projection board, 42 designates a photo device, 43 designates a 3D-position output module, and 44 designates a lay-projection module.

The present embodiment 5 is configured such that the lay-projection module 44 irradiates the surface of the projection board 41; the photo device 42 observes a figure or the like of scanning loci drawn on the surface; and the 3D-position output module 43 processes the observed information and scanning information, and outputs the translation and rotation of the photo device 42.

Figure 15:
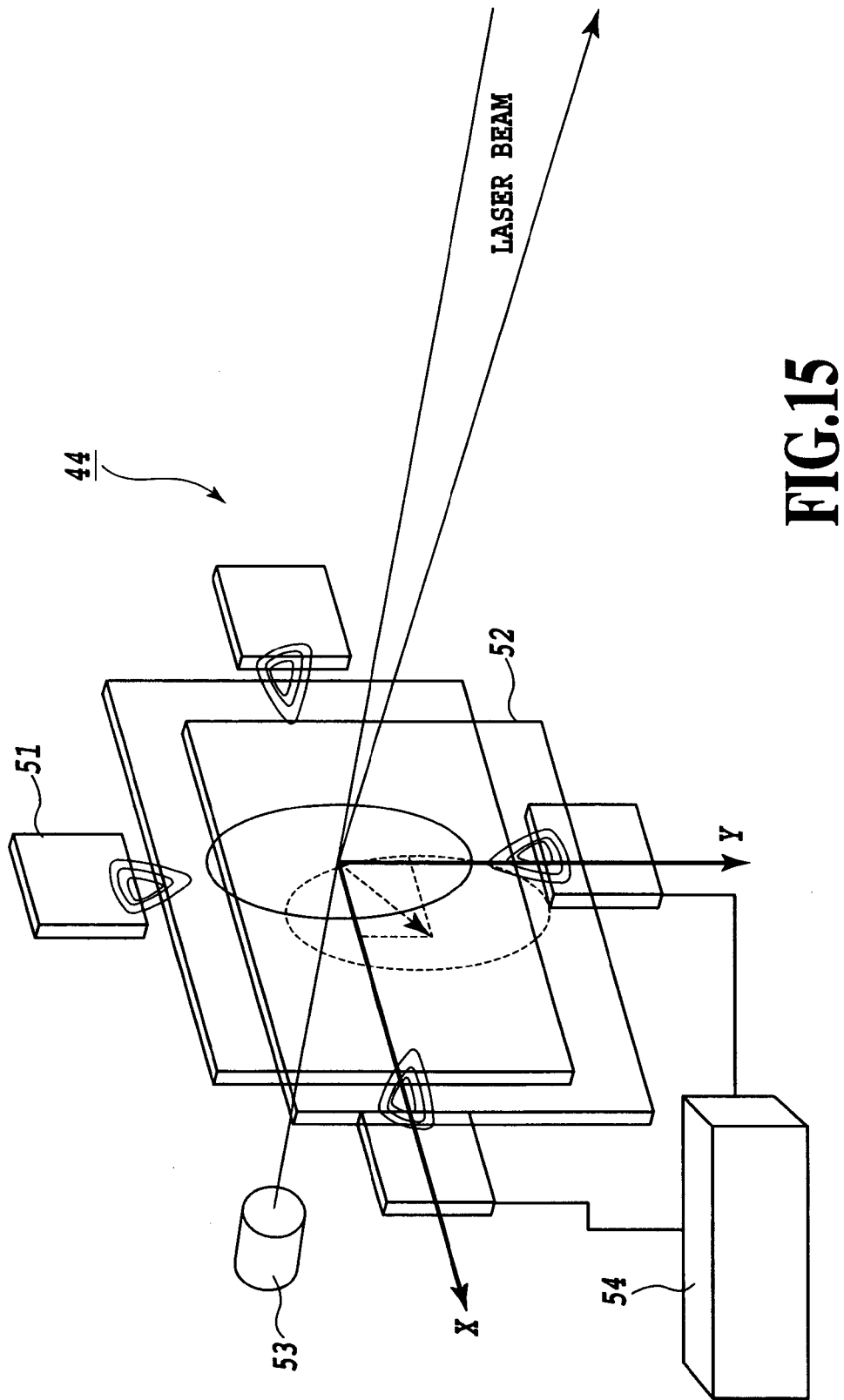
FIG. 15 is a perspective view illustrating a lay-projection module of the fifth embodiment in accordance with the present invention.

FIG. 15 is a perspective view illustrating the lay-projection module 44 of the fifth embodiment in accordance with the present invention. In FIG. 15, the reference numeral 51 designates a magnetic circuit, 52 designates a lens, 53 designates a laser beam module, and 54 designates a control signal module. The lay-projection module 44 carries out any spatial laser scanning by a control method disclosed in Japanese Patent Application Laid-open No. 6-300542 (1994), titled "SHAPE FEATURE EXTRACTION DEVICE WITH TWO-DIMENSIONAL LASER PATTERN AND TWO-DIMENSIONAL LASER PATTERN".

Figure 16:
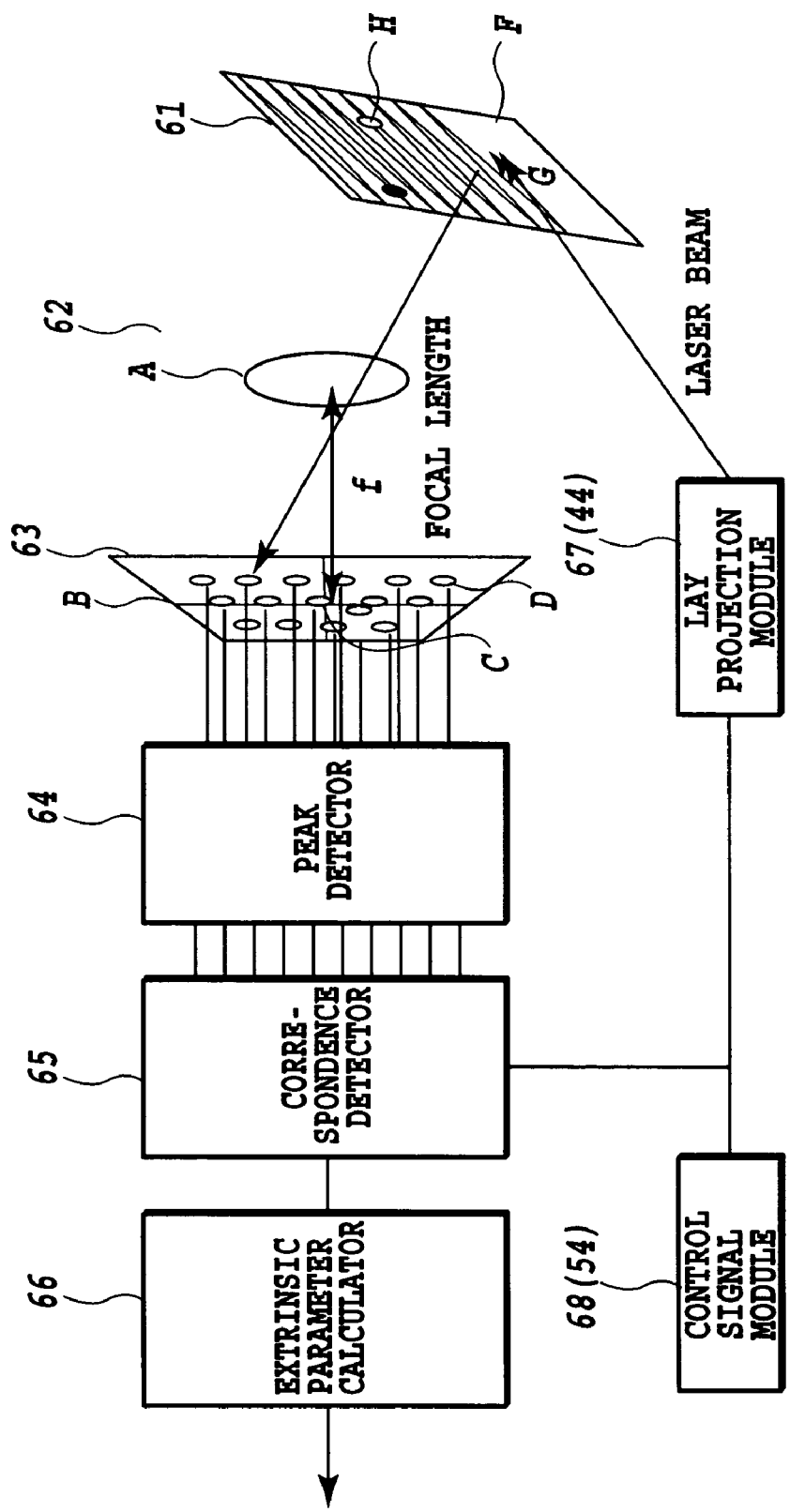
FIG. 16 is a block diagram showing a configuration of the fifth embodiment in accordance with the present invention.

FIG. 16 is a block diagram showing a configuration of the fifth embodiment in accordance with the present invention. The present embodiment 5 employs multiple photo detectors for converting the intensity of light into electric signals as the photo detectors of the photo device 42. In FIG. 16, the reference symbol A designates a lens, B designates a projection plane of the light passing through the lens A, C designates a center at which the optical axis of the lens intersects with the projection plane B, D designates photo detectors, F designates the display surface of the projection board irradiated by the laser, 61 designates a display, 62 designates a condense unit, 63 designates the projection plane, 64 designates a peak detector, 65 designates a correspondence detector, 66 designates an extrinsic parameter calculator, 67(44) designates the lay-projection module, and 68(54) designates the control signal module.

The photo detectors D are disposed on the projection plane. The display surface F is irradiated with the laser beam at every predetermined period such that the high brightness spot moves along the arrow G at high speed. When the high brightness spot passes on the intersection (H, for example) of the display surface F and the line connecting one of the photo detectors D and the center of the lens A, the photo detector D outputs a peak.

The peak detector 64 detects peak values of the individual photo detectors D. The correspondence detector 65 can determine the intersection on the screen by calculating the correspondence between the peak time and a control signal (x, y) transmitted from the control signal module 68 to the lay-projection module 67.

The extrinsic parameter calculator 66 calculates the 3-D translation and rotation of the photo device with respect to the bright spot scanning surface of the display from a set consisting of multiple bright spot display positions and their projection positions.

Figure 17:
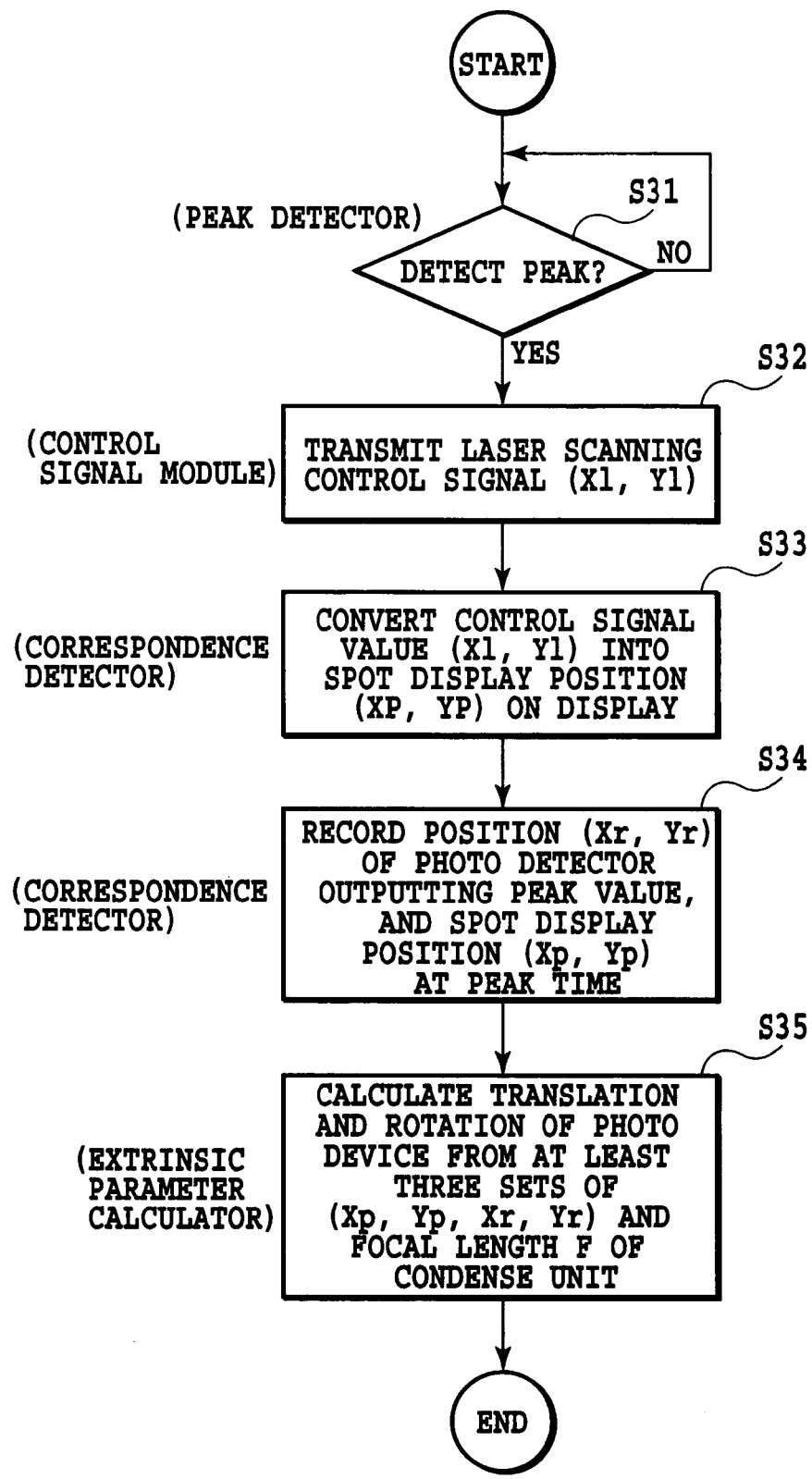
FIG. 17 is a flowchart illustrating the operation of the fifth embodiment in accordance with the present invention.

FIG. 17 is a flowchart illustrating the operation of the fifth embodiment in accordance with the present invention. Referring to this figure, the operation will be described in detail.

(First Stage)

Assume that the peak detector 64 detects the peak value of one of the photo detectors D (step S31). At the peak time, the correspondence detector 65 receives the laser scanning control signal (Xl, Yl) transmitted from the control signal module 68 shown in FIG. 16 (step S32).

(Second Stage)

The correspondence detector 65 converts the laser scanning control signal into the spot display position (Xp, Yp) on the projection board (step S33), and records the position (Xr, Yr) of the photo detector D outputting the peak value, and the spot display position (Xp, Yp) at that time (step S34). The conversion from (Xl, Yl) to (Xp, Yp) is carried out using the following equations, in which case, the conversion coefficients a0–a5 are obtained in advance.

$$Xp = a0 \cdot Xl + a1 \cdot Yl + a2$$

$$Yp = a3 \cdot Xl + a4 \cdot Yl + a5$$

(Third Stage)

The extrinsic parameter calculator 66 can determine the translation and rotation of the photo device 42 from a set of (Xp, Yp, Xr, Yr) of at least three points and from the focal length of the condense unit 62 (step S35). In this case, the calculation of the 3-D translation and rotation of the photo device is carried out using the calculation method as illustrated in FIG. 6.

Embodiment 6

Figure 18:
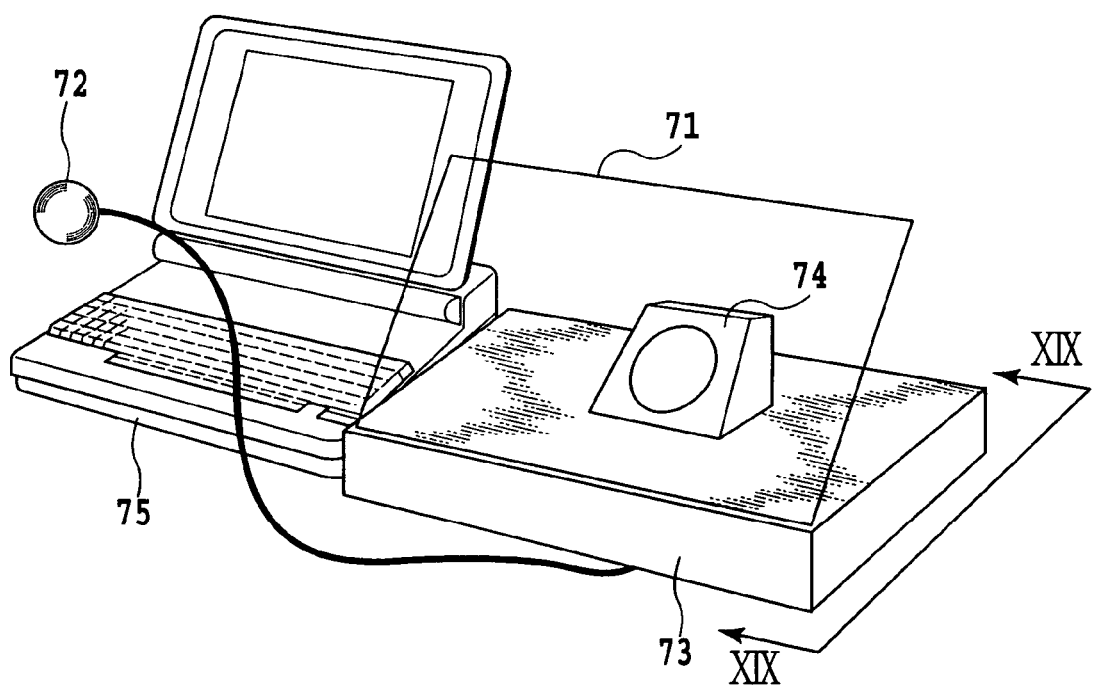
FIG. 18 is a perspective view illustrating an overall configuration of a sixth embodiment in accordance with the present invention.
Figure 19:
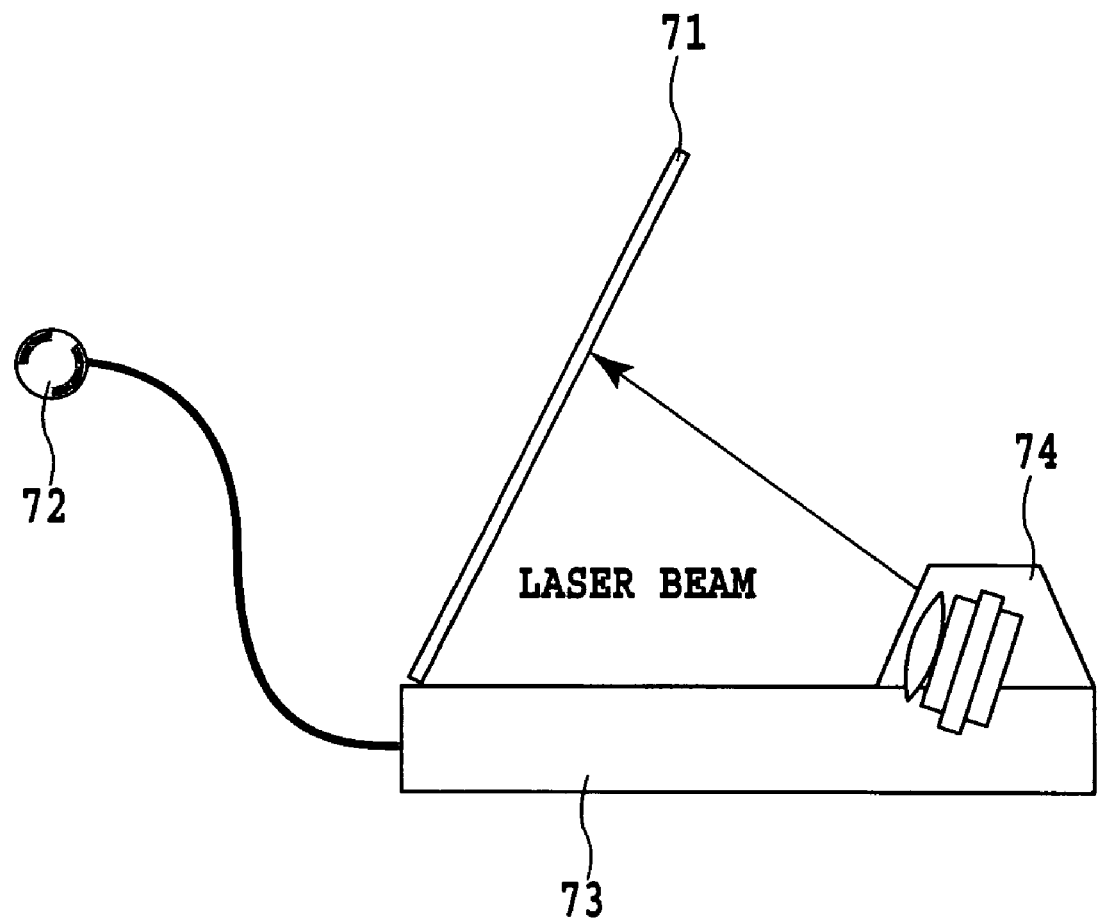
FIG. 19 is a side view taken along line A—A of FIG. 18.

FIGS. 18 and 19 are views showing a sixth embodiment in accordance with the present invention: FIG. 18 is a perspective view showing the entire apparatus; and FIG. 19 is a side view of the apparatus. In these figures, the reference numeral 71 designates a projection board, 72 designates a photo device, 73 designates a 3D-position output module, 74 designates a lay-projection module, and 75 designates a personal computer.

The projection board 71 is made translucent so that the bright spot of the laser light irradiated from the lay-projection module 74 undergoes diffused reflection on the bottom surface of the projection board 71 to display only the bright spot on the top surface of the projection board 71. The present apparatus supposes the 3-D input to a PC without a raster-type display, and transmits the 3-D translation and rotation of the photo device 72 with respect to the projection board 71 to the personal computer 75 connected therewith.

The perspective view of the lay-projection module, the block diagram showing the configuration and the flowchart illustrating the operation of the present embodiment are the same as those of the fifth embodiment as shown in FIG. 14.

The present invention has been described in detail with respect to preferred embodiments, and it will now be apparent from the foregoing to those skilled in the art that changes and modifications may be made without departing from the invention in its broader aspect, and it is the intention, in the apparent claims to cover all such changes and modifications as fall within the true spirit of the invention.

What is claimed is:

1. An input method of 3-D translation and rotation for measuring 3-D translation and rotation of a photo device with respect to a display emitting a bright spot, said input method of 3-D translation and rotation comprising the steps of:

moving the bright spot freely on a display surface of said display;

condensing the bright spot on said display, and detecting a projection position of a spot light projected onto a projection plane;

bringing a bright spot display position on said display into correspondence with the projection position of the spot light on photo detectors; and calculating the 3-D translation and rotation of said photo device with respect to the bright spot display surface of said display from a set of multiple bright spot display positions and their projection positions which are brought into correspondence.

2. The input method of 3-D translation and rotation as claimed in claim 1, wherein said photo detectors for detecting the projection position of the spot light consist of a set of photo detectors, each of which includes a spot-like photo window.

3. The input method of 3-D translation and rotation as claimed in claim 2, wherein the step of bringing comprises the sub-steps of:

bringing a projection image position on said photo detectors into correspondence with projection time, the projection image position being a position formed by projecting the bright spot on said display onto the projection plane of said photo device;

recording the projection position and projection time; and bringing bright spot display positions at multiple times into correspondence with their projection positions in accordance with the recorded projection time.

4. The input method of 3-D translation and rotation as claimed in claim 1, wherein said photo detectors for detecting the projection position of the spot light consist of a photo detector including a flat photo detecting face for detecting the position of the spot light.

5. The input method of the 3-D translation and rotation as claimed in claim 4, wherein the steps of bringing comprises the sub-steps of:

bringing a projection image position of the spot light on said photo detectors into correspondence with projection time, the projection image position of the spot light being a position formed by projecting the bright spot on said display onto the projection plane of said photo device;

recording the projection position and projection time; and bringing bright spot display positions at multiple times into correspondence with their projection positions in accordance with the recorded projection time.

6. A computer readable recording medium storing a computer program for causing a computer to execute an input method of 3-D translation and rotation for measuring 3-D translation and rotation of a photo device with respect to a display emitting a bright spot, said computer readable recording medium causes the computer to execute the steps of:

moving the bright spot freely on a display surface of said display;

condensing the bright spot on said display, and detecting a projection position of a spot light projected onto a projection plane;

bringing a bright spot display position on said display into correspondence with the projection position of the spot light on photo detectors; and calculating the 3-D translation and rotation of said photo device with respect to the bright spot display surface of said display from a set of multiple bright spot display positions and their projection positions which are brought into correspondence.

7. The recording medium as claimed in claim 6, wherein said photo detectors for detecting the projection position of the spot light consist of a set of photo detectors, each of which includes a spot-like photo window, and wherein the step of bringing comprises the sub-steps of:

bringing a projection image position on said photo detectors into correspondence with projection time, the projection image position being a position formed by projecting the bright spot on said display onto the projection plane of said photo device;

recording the projection position and projection time; and bringing bright spot display positions at multiple times into correspondence with their projection positions in accordance with the recorded projection time.

8. The recording medium as claimed in claim 6, wherein the spot light on said photo detectors at the step of bringing is the spot light detected and output from said photo detectors, and wherein the step of bringing comprises the substeps of:

bringing a projection image position of the spot light on said photo detectors into correspondence with projection time, the projection image position of the spot light being a position formed by projecting the bright spot on said display onto the projection plane of said photo device;

recording the projection position and projection time; and bringing bright spot display positions at multiple times into correspondence with their projection positions in accordance with the recorded projection time.

* * * * *